US012579322B2

(12) United States Patent (10) Patent No.: US 12,579,322 B2
Moran et al. (45) Date of Patent: Mar. 17, 2026

(54) LOCAL DEVICE ATTESTATION

(71) Applicant: Arm Limited, Cambridge (GB)

(72) Inventors: Brendan James Moran, Coton (GB);
Yogesh Bhalchandra Deshpande,
Ashford (GB); Carlos Garcia-Tobin,
Ely (GB)

(73) Assignee: ARM LIMITED, Cambridge (GB)

( * ) Notice: Subject to any disclaimer, the term of this
patent is extended or adjusted under 35
U.S.C. 154(b) by 31 days.

(21) Appl. No.: 18/751,994

(22) Filed: Jun. 24, 2024

(65) Prior Publication Data

US 2025/0390610 A1 Dec. 25, 2025

(51) Int. Cl.
| | |
|---|---|
| *H04L 29/06* | (2006.01) |
| *G06F 21/57* | (2013.01) |
| *G06F 21/64* | (2013.01) |
| *H04L 9/08* | (2006.01) |

(52) U.S. Cl.
CPC .............. *G06F 21/64* (2013.01); *G06F 21/57*
(2013.01); *H04L 9/0869* (2013.01)

(58) Field of Classification Search
CPC ......... G06F 21/64; G06F 21/57; H04L 9/0869
See application file for complete search history.

(56) References Cited

U.S. PATENT DOCUMENTS

| | | | |
|---|---|---|---|
| 2012/0198514 A1 | 8/2012 | McCune et al. | |
| 2016/0267260 A1* | 9/2016 | Jiang .................. | H04W 12/084 |
| 2017/0171746 A1* | 6/2017 | Haase ...................... | H04L 9/10 |
| 2022/0091998 A1 | 3/2022 | Lal et al. | |

FOREIGN PATENT DOCUMENTS

| | | | | | |
|---|---|---|---|---|---|
| CN | 102034542 A | * | 4/2011 | | |
| WO | WO-2019130042 A1 | * | 7/2019 | ............. | G06F 21/83 |
| WO | 2023117248 A1 | | 6/2023 | | |

OTHER PUBLICATIONS

Schulz, Steffen, et al. "Boot attestation: Secure remote reporting
with off-the-shelf IoT sensors." European Symposium on Research
in Computer Security. Cham: Springer International Publishing,
2017. (Year: 2017).*
Extended European Search Report issued in European Patent Office
Application No. 25179914.4, mailed Aug. 25, 2025, 10 pages.

* cited by examiner

*Primary Examiner* — Shawnchoy Rahman
(74) *Attorney, Agent, or Firm* — Talem IP Law, LLP

(57) ABSTRACT

A method of performing local device attestation is provided.
The method includes receiving, by a trustable device, an
instruction from a user to perform attestation of a user
device, creating, by the trustable device, an attestation
request comprising a random number whereby attestation
evidence is generated and includes the random number, the
attestation evidence is then signed, and the attestation evi-
dence is communicated to a verifier to generate an attesta-
tion report of the attestation evidence, receiving, by the
trustable device, the attestation result of the verifier, the
attestation result including a signature of the verifier, and
validating, by the trustable device, content of the user device
by verifying the signature of the verifier in the attestation
report.

20 Claims, 6 Drawing Sheets

100

200

Receive, by a trustable device, an instruction from a user to perform attestation of a user device    202

Create, by the trustable device, an attestation request comprising a random number    204

Receive, by the trustable device, the attestation result of the verifier that includes the verifier signature    206

Validate, by the trustable device, content of the user device    208

300

500

LOCAL DEVICE ATTESTATION

BACKGROUND

Attestation allows a device to prove properties about itself such as what software it is running, its identity, security capabilities, etc. Remote attestation is used as part of a process to establish trust between devices so that information passed between the two devices can be expected to be authentic, intact, and trustworthy. However, when the remote attestation results are presented to a user on a user device, there is no mechanism at the user interface of the user device to ensure that the trustworthiness from the attestation is retained.

Ultimately, users are at the mercy of their most trustworthy computing device. For example, if an attacker is able to compromise the user device at the user interface where the result of the attestation is presented, the user can no longer trust that the user device is providing accurate information. Even worse, the attacker can then provide spoofing inputs on the user interface to mimic what the user expects to see on the display to maliciously obtain private data from the user. Therefore, a process that can prove trustworthiness of the user's device including the presentation layer, e.g., user interface, is desired.

BRIEF SUMMARY

A method and system to perform local device attestation are presented. Instead of using a remote host to perform the attestation as is done with remote attestation, a local device such as a security dongle, secure enclave, and a buddy device can be used to perform the attestation. Through the processes and system described herein, a user can gain trust that the computing device, e.g., the user's device or user device, and the information shown on its user interface has not been compromised and is therefore trustworthy.

A method of performing local device attestation can include receiving, by a trustable device, an instruction from a user to perform attestation of a user device, creating, by the trustable device, an attestation request comprising a random number whereby attestation evidence is generated and includes the random number, the attestation evidence is then signed, and the attestation evidence is communicated to a verifier to generate an attestation report of the attestation evidence, receiving, by the trustable device, the attestation result of the verifier, the attestation result including a signature of the verifier, and validating, by the trustable device, content of the user device by verifying the signature of the verifier in the attestation report.

A system for performing local device attestation includes a user device for attestation, a trustable device in communication with the user device, the trustable device creates an attestation request of the user device whereby initiating generation of attestation evidence upon a boot of the user device, wherein the attestation evidence is communicated to a verifier, and the verifier that verifies the attestation evidence and communicates attestation results in an attestation report to the trustable device. The trustable device validates the attestation report for the user device and is one of a security dongle, a secure enclave disposed on the user device, and a buddy device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system for performing local device attestation is presented. Through the processes described herein, a user can gain trust that the computing device, e.g., the user's device or user device, and the information shown on its user interface has not been compromised and is therefore trustworthy. Instead of using a remote host to perform the attestation as is done with remote attestation, a local device can be used to perform the attestation. As described herein, local device attestation can be performed by a trustable device, where the trustable device can be any device that demonstrates trustworthiness such as a security dongle, a secure enclave, or a buddy device.

In remote attestation processes, there can be three parties involved: a device to be attested, e.g., the attester, a relying party that forms a trust relationship with the attester as a result of the attestation, and a verifier that performs a verification of presented attestation evidence. For example, in secure communication between parties, a relying party, such as a bank, relies on a verifier to establish the integrity of an individual or device in communication with the relying party. A device in communication with the relying party presents its credentials in a message to the relying party. These credentials are termed attestation evidence. The relying party will then forward the attestation evidence to the verifier for evaluation and receive a verdict of the attestation. For example, the attester, e.g., the device in this example, presents evidence including a set of data with at least one claim (e.g., a hardware revision) and measurements. One measurement that can be included is the device's public key. Another common measurement is the digest of the software that will be executed in a secure computing system environment.

While it is possible to use remote attestation to prove the integrity of the user device to a relying party, this may not be adequate for a user of the user device as the remote attestation process does not prove the integrity of the presentation layer interpreting the attestation result on the user device. Local device attestation can be used to prove that the whole stack of layers on the user device including the user interface is uncompromised.

Figure 1:
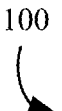
FIG. 1 illustrates an operating environment for a current implementation of remote attestation.
Figure 1:
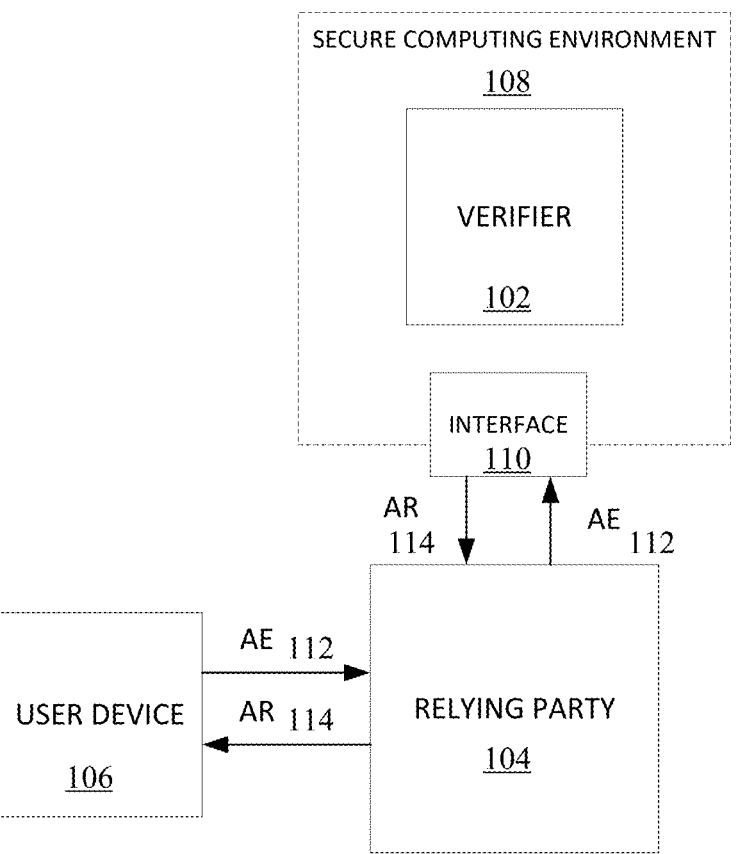

FIG. 1 illustrates an operating environment for a current implementation of remote attestation. Referring to FIG. 1, operating environment 100 includes a user device 106 in communication with a relying party 104. The relying party 104 is also in communication with a verifier 102. During certain communications between the user device 106 and relying party 104, the relying party 104 relies on verifier 102 to establish the integrity of the user device 106 so that those certain communications and associated operations can be considered secure.

User device 106 includes one or more devices capable of receiving, generating, storing, processing, and/or providing information associated with a user (e.g., employment-related information). For example, user device 106 may include a communication and/or computing device, such as a mobile phone (e.g., a smartphone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. User device 106 can include a stack of layers including an operating system, applications, network interface, cryptographic information, and a presentation layer, e.g., the user interface.

Verifier 102 is a trusted source of authenticity used in the attestation process to determine whether the content of the attestation evidence can be trusted. Upon receiving signed attestation evidence 112, verifier 102 audits the attestation evidence 112 and presents the results of the audit, e.g., as attestation results, in an attestation report 114. The attestation results indicate that the attestation evidence is trustworthy or that the attestation evidence is not trustworthy.

In some cases, for example, to provide a high level of security, verifier 102 can be hosted within a secure computing system environment 108. The secure computing system environment 108 may be a data center such as a cloud data center and may include specialized hardware such as a hardware security module (HSM). In an embodiment, a trusted execution environment (TEE) can be executed by the secure computing system environment 108. The trusted execution environment may include physical circuitry elements such as hardware comprising logical elements controlled by a central processing unit. As an example, a CCA realm, a hardware-based trusted execution environment, can be utilized as the secure computing system environment 108. Verifier 102 executes its code within secure computing system environment 108 and can verify attestation evidence in a message presented to verifier 102 for correctness. The secure computing system environment 108 includes an interface 110 to communicate with other entities. The interface 110 includes interface circuitry to provide communication between the secure computing system environment circuitry and circuitry of an entity that is communicatively coupled to the secure computing system environment 108.

For remote attestation, in some cases, such as the implementation shown in FIG. 1, user device 106 in communication relying party 104 presents its credentials in a message, e.g., the attestation evidence 112, to the relying party 104. For example, the attester, e.g., user device 106, presents a set of data including at least one claim and measurements. The relying party 104 sends attestation evidence 112 to the verifier 102 to be verified. Verifier 102 verifies the attestation evidence 112 for correctness and sends an attestation report 114 back to the relying party 104 with the attestation results. The attestation report 114 can be sent back to the user device 106 and presented to the user at the user interface of device 106. The attestation report 114, can at a minimum, include a request ID of the attestation evidence and a signature to prove trustworthiness to the relying party 104.

In other cases of remote attestation, the attester can be in direct communication with the verifier. The attester performs an attestation using a timestamp as the request ID and sends the attestation evidence to the verifier. Like the case described above, the verifier performs a verification of the attestation evidence for correctness and sends an attestation report. However, in this case, the attestation report is sent back to the attester. The attester then presents the attestation report to the relying party who validates the verifier's signature which establishes the trust relationship.

Attestation evidence can be created in different ways. In some cases, attestation evidence can be created using a secure log. A secure log records measurements in a tamper-proof way, then signs and returns the current secure log on request. This is typically implemented in a secure element such as a Trusted Platform Module (TPM). In other cases, a signature chain can be used. For a signature chain, a log of evidence is signed before each change in trust level. For example, the signature chain can be first signed by the hardware of the device before a bootloader of the device is used. The bootloader itself can then sign the attestation evidence after performing its operations. Additionally, other components of the device can sign the attestation evidence as well as the operating system (OS) of the device. Each signature corresponding to a piece of attestation evidence of the signature chain is entered into the log. The signatures in the log are important for identity verification purposes. For example, the signatures can be used as proof that the pertinent keys were used for signing each piece of attestation evidence and that the attestation evidence has not been tampered with during the attestation process. Additionally, to ensure that the process has not been tampered with, a random number can be attached to each signature. Both of these example cases provide a trustable log of measurements and claims on the user device.

Figure 2:
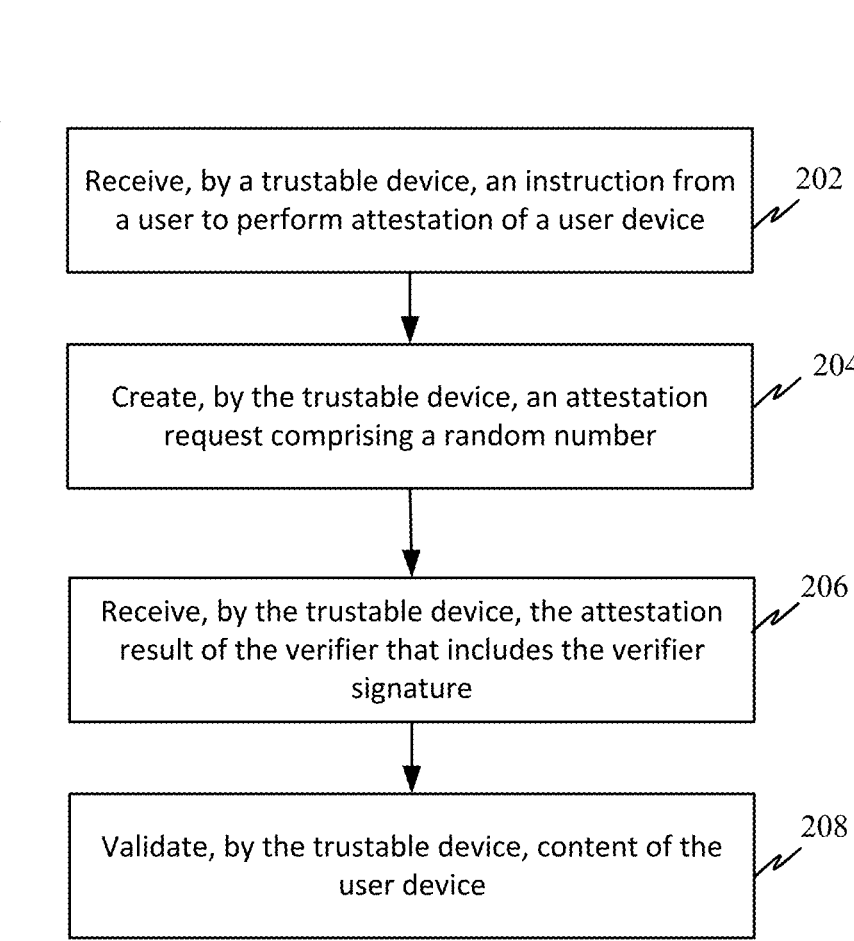
FIG. 2 illustrates a method of performing local device attestation.

FIG. 2 illustrates a method of performing local device attestation. Referring to FIG. 2 method 200 includes receiving (202), by a trustable device, an instruction from a user to perform attestation of a user device; creating (204), by the trustable device, an attestation request comprising a random number whereby attestation evidence is generated, signed with the random number, and communicated to a verifier to generate an attestation result of the attestation evidence; receiving (206), by the trustable device, the attestation result of the verifier that includes a signature of the verifier; and verifying (208), by the trustable device, content of the user device.

Figure 3:
FIG. 3 illustrates an example operating environment for implementing local device attestation as described herein.
Figure 3:
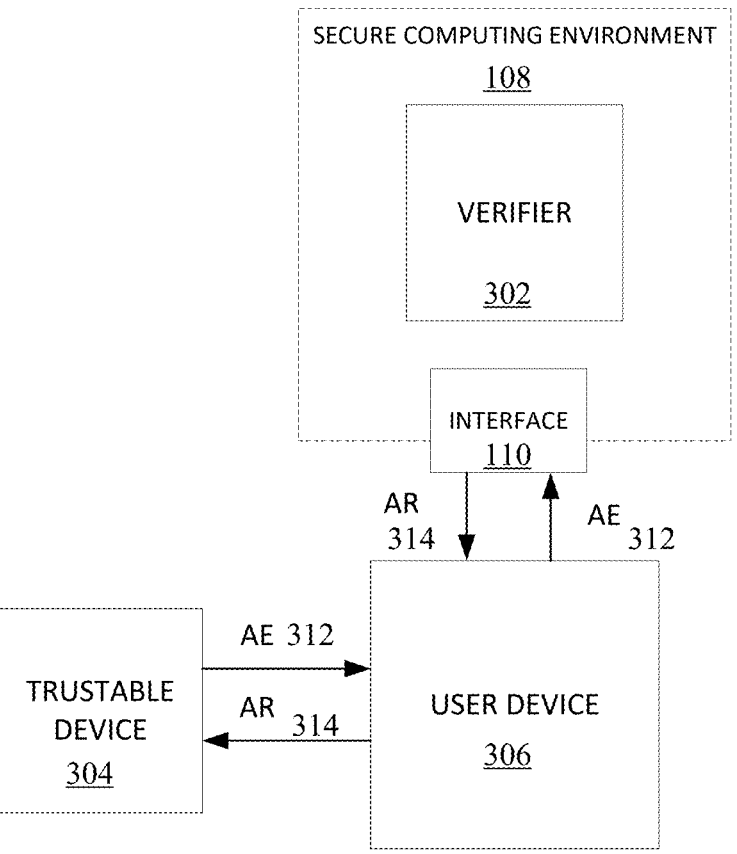
Figure 4:
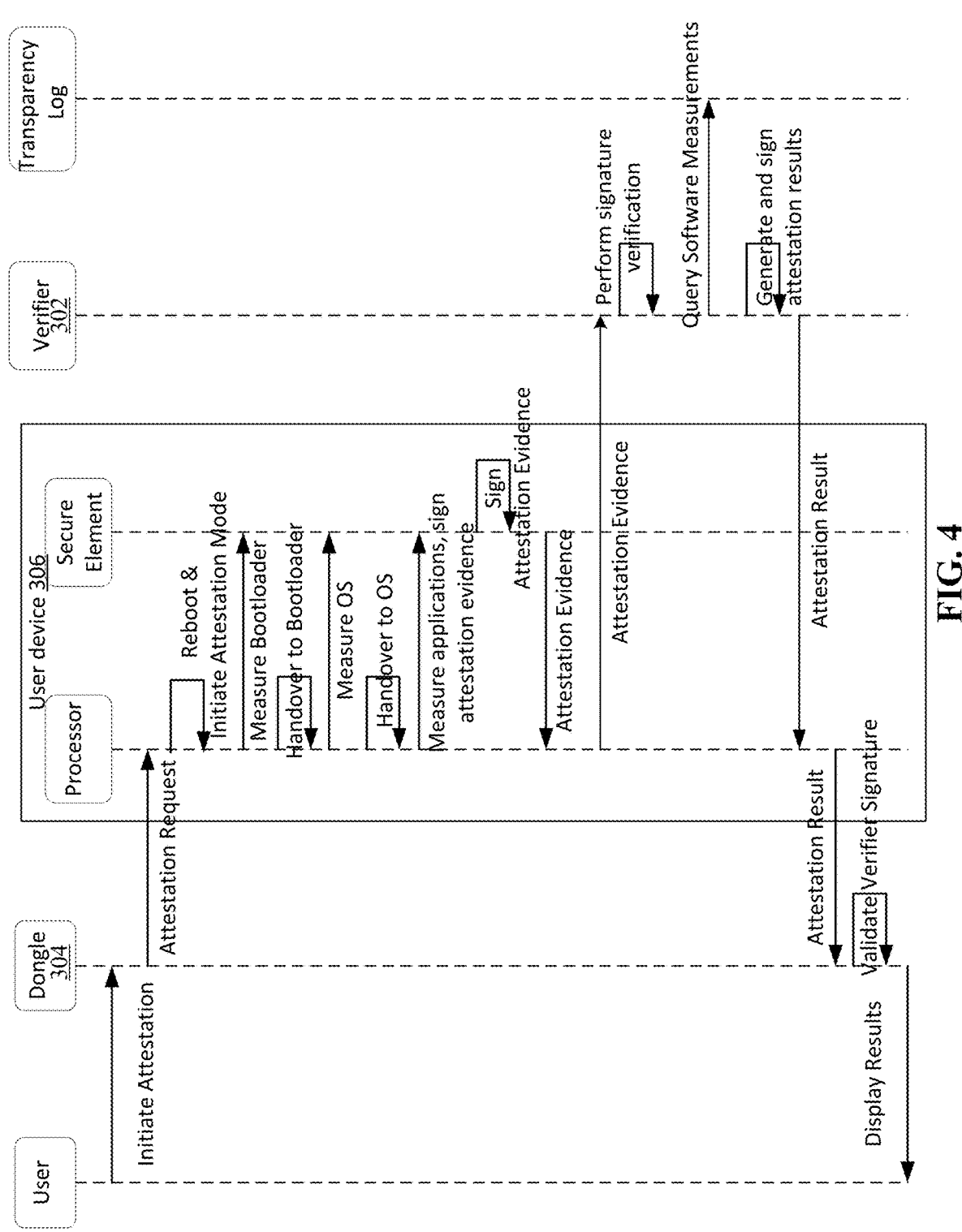
FIG. 4 illustrates a sequence diagram for implementing local device attestation for the example operating environment of FIG. 3.

FIG. 3 illustrates an example operating environment for implementing local device attestation and FIG. 4 illustrates a sequence diagram for implementing local device attestation according to the example operating environment of FIG. 3. Referring to FIG. 3, operating environment 300 includes user device 306, verifier 302, and trustable device 304. The trustable device 304 in the illustrated example is a separate hardware component. In some cases, and for the purposes of the illustrated example shown in FIG. 3 and FIG. 4, the separate hardware component is a security dongle.

The security dongle 304 is a small hardware device that can connect to the user device 306 through a data port, such as a USB port, for example. Security dongles are considered to be highly secure devices and are therefore typically trusted. However, the security dongle could still pose a threat to the attesting user device. Thus, in some cases, the security dongle 304 is an attested device in that it has already been attested to prove its trustworthiness to the user device 306 prior to local device attestation. Security dongle 304 includes cryptographic signature capabilities such as signing, using a key for example, and verifying signatures from other entities. Additionally, security dongle 304 includes a random number generator to create a random number that is used for the local device attestation.

In some cases, a connection between the user device 306 and security dongle 304 can be established by inserting the security dongle 304 into a data port on the user device 306. In other cases, the connection can be established by pairing the user device 306 and the security dongle 304 over a wireless network such as Bluetooth®. Other wireless technology can also be used for communication between the user device 306 and the security dongle 304 such as Wi-Fi or NFC (Near Field Communication). A user can initiate an attestation request via the security dongle 304. For example, the user can press a button on the security dongle 304 to start the local device attestation process.

FIG. 4 illustrates a sequence diagram for implementing local device attestation using a security dongle. The sequence diagram details the operational commands and responses between the user, trustable device, e.g., security dongle, 304, user device 306, verifier 302, and a transparency log.

Security dongle 304 receives (202) an instruction from the user to perform attestation and creates an attestation request and transmits it to the user device 306. Security dongle 304 creates (204) an attestation request comprising the random number. The random number can be considered the request ID. The random number can be generated by the random number generator on the security dongle 304. In some cases, when the user device 306 receives the attestation request from the security dongle, the user device 306 initiates an attestation mode for an attestation of the user device 306 in response to a boot of the user device 306. In some cases, the attestation request comprising the random number is stored in an area of memory until the user device 106 boots.

Upon receiving an attestation request, attestation evidence is generated. In some implementations, such as the example implementation shown in FIG. 3 and FIG. 4, attestation evidence is generated by user device 306. The attestation evidence can include the attestation request. While different modes of generating attestation evidence can be used such as those previously described, a trustable log is generated that includes one or more signatures. Attestation evidence 312 can also include trust metrics of the security dongle 304, such as a public key.

Upon the boot of the user device 306, the user device 306 detects the security dongle 304 and enters the attestation mode. In response to discovering an attestation request pending from receiving a signed attestation request, e.g., with the random number, the user device 306 initiates attestation by generating the attestation evidence. Attestation evidence can be generated by measuring components of the user device and signing them with a signature. For example, a bootloader on the user device 306 adds its boot record to the attestation evidence 312 and continues with an attested boot process. The boot record identifies a location in memory where the operating system (OS) resides so that the OS can be loaded into memory. The bootloader can also measure the OS and add the measurement of the OS to the attestation evidence. If the OS is signed, the OS adds the signature to the attestation evidence as well. Attestation of the bootloader can be performed by hardware on the user device 306 providing confidence that the bootloader has not been tampered with. This hardware signs the boot record using a key. The signature is then added to the attestation evidence. In some cases, other entities, such as applications on user device 306, can be measured and signed. The measurements and signatures can then be added to the attestation evidence as well. A secure element of the user device signs the attestation evidence. The attestation evidence includes the random number. The attestation evidence can also include a digest of software and any claims such as model identifiers or signatures of software.

The user device 306 communicates the signed attestation evidence 312 to a verifier 302 to generate an attestation result 314 of the attestation evidence 312. The OS of the user device 306 contacts the verifier 302 for verification of the signatures and sends the attestation evidence 312 including the signatures to the verifier 302.

Verifier 302 performs signature verification of the attestation evidence and completes the verification by signing a generated attestation result of the attestation evidence with its key. The verification can include verifying that the signature of the bootloader is a valid signature for the hardware that generated the signature. In some cases, the verification can include the verifier 302 simply signing the random number with its key. The attestation result 314, e.g., a verifier signature, is communicated back to the trustable device 304 via user device 306 in an attestation report.

Security dongle 304 receives (206) the attestation result 314 of the verifier 302 that includes the signature of the verifier. In order to validate (212) the content of the user device 306, the security dongle 304 then verifies the verifier signature in the attestation result 314. Verifying the verifier signature is performed by checking that the verifier signature of the attestation evidence 312 matches the corresponding verifier's public key and additionally that the random number included in the attestation report matches the random number generated by the trustable device.

Figure 5:
FIG. 5 illustrates a further example operating environment for implementing local device attestation as described herein.
Figure 5:
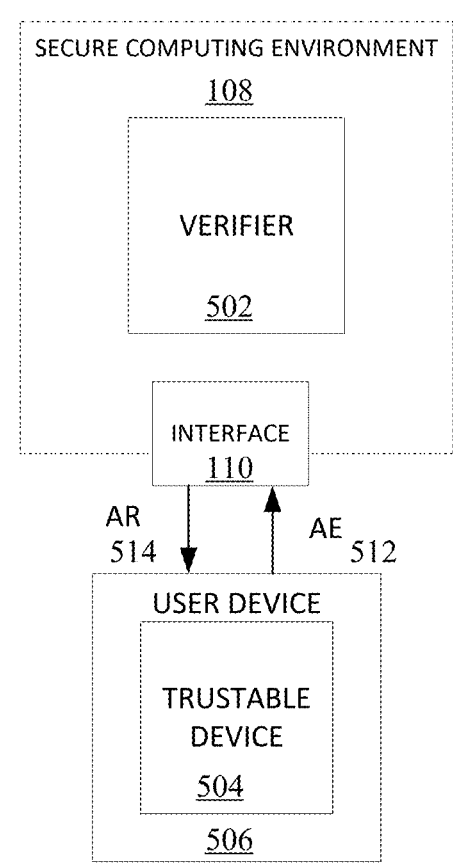

FIG. 5 illustrates another example operating environment for implementing local device attestation as described herein. Referring to FIG. 5, operating environment 500 includes user device 506, verifier 502, and trustable device 504. The trustable device 504 in the illustrated example is a secure enclave disposed on the user device 506. For example, the secure enclave can be a dedicated secure subsystem, such as a trusted platform module, that resides on the same chip as the processor of the user device. Like security dongle 304, secure enclave 504 includes a random number generator and cryptographic signature capabilities.

In the scenario illustrated in FIG. 5, a user initiates an attestation request via the user device 506. In response to receiving the attestation request from the user, the user device 506 boots. Upon the boot of the user device 506, the secure enclave 504 receives (202) the instruction from the user to perform attestation of the user device and initiates an attestation mode for an attestation of the user device 506.

In attestation mode, secure enclave 504 creates (204) the attestation request comprising the random number. The random number can be generated by the random number generator within the secure enclave 504. The secure enclave 504 records the attestation request with the random number in a log to create the attestation evidence. The attestation evidence 512 can include boot measurements measured by the secure enclave 504 during the boot of the user device 506. The boot measurements can then be added to the attestation evidence. Each measurement and claim corresponding to a piece of attestation evidence is entered into the log. Secure enclave 504 then communicates, the attestation evidence 512 comprising the attestation request and the log to the verifier 502 to generate an attestation report of the attestation evidence 512. Verifier 502 performs a verification of the attestation evidence 512 and sends the signed, e.g., with a verifier signature, attestation results 514 back to the secure enclave 504 in the attestation report.

Similar to the process flow described with respect to security dongle 304, secure enclave 504 receives (206) the attestation report of the verifier 502 that includes the verifier signature. In order to validate (212) the content of the user device 506, the secure enclave 504 then verifies, the verifier signature in the attestation report.

In some cases, the attestation results can then be communicated to the user by the trustable device, for presentation at the user interface. When utilizing security dongle 304 the attestation result can be communicated to the user utilizing an LED light(s) on the security dongle 304. Here, it is assumed that the trustable device, e.g., security dongle 304, cannot be compromised at its presentation layer as it is separate from the user device 306. For example, a red light can indicate to the user that the attestation failed, and a green light can indicate to the user that the attestation succeeded. In some cases, the LED light(s) can also indicate to the user that the software version (as determined in the verifier using a firmware transparency log) is out of date.

In some cases, secure enclave 504 utilizes secure I/O, e.g., secure input/output, to demonstrate to the user that an attestation has been done and validated in a trustworthy manner. Typically, the secure enclave includes a secure I/O feature that can be, for example, a bicolored LED, that can only be controlled by the secure enclave 504 to prove that received data has not been tampered with. Therefore, upon a validation of received data, e.g., attestation results, the secure enclave 504 can use the dedicated bicolored LED(s) to present the attestation results on the user interface.

In a further example implementation of local device attestation, the trustable device can be a buddy device. Referring back to FIG. 1, the relying party 104 can be a buddy device that is used to establish trust in user device 106. For example, the buddy device can be a similar device to user device 106, but a separate device from user device 106, that is physically proximate to the attester and can be connected via LAN, PAN, WAN or a data cable. That is, the buddy device can be a mobile phone (e.g., a smartphone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. The buddy device can be used to validate the attestation evidence of the user device 106. In order to further ensure that the buddy device is trustworthy enough to perform the local attestation, it could first be attested using the current implementation of the remote attestation process as described with respect to FIG. 1. Upon establishing a connection to the buddy device, the user device 106 boots in order to present current measurements in the attestation evidence. The attestation is performed as detailed in FIG. 1 and described previously.

In some cases, the verifier, 302, 502 employs a firmware transparency log to perform the verification. Transparency logs are a tool for storing information and presenting it to users in such a way that the users can verify they each see the same entries. For example, each time the vendor of the user device provides an update to the operating system and the corresponding firmware, it is published on the firmware transparency log. During the verification, the software and firmware as specified in the attestation evidence can be checked to see if the version on the user device is the most up to date version. The result of this check can be provided in the attestation result, so the user knows whether the software and firmware versions on user device are up to date or not. Using the firmware transparency log provides some accountability to users as a tool to help determine that the software running on the user device is not compromised, e.g., that a malicious actor is not providing compromised software to user devices.

In some cases, the trustable device can specify a particular verifier to use for the verification of the communicated attestation evidence. For example, a security dongle can, through a configuration interface, specify which verifier it expects to evaluate the attestation evidence generated by the user device. The trustable device can embed the specification of the particular verifier in the attestation request. This allows the trustable device to specify a verifier it trusts.

Figure 6:
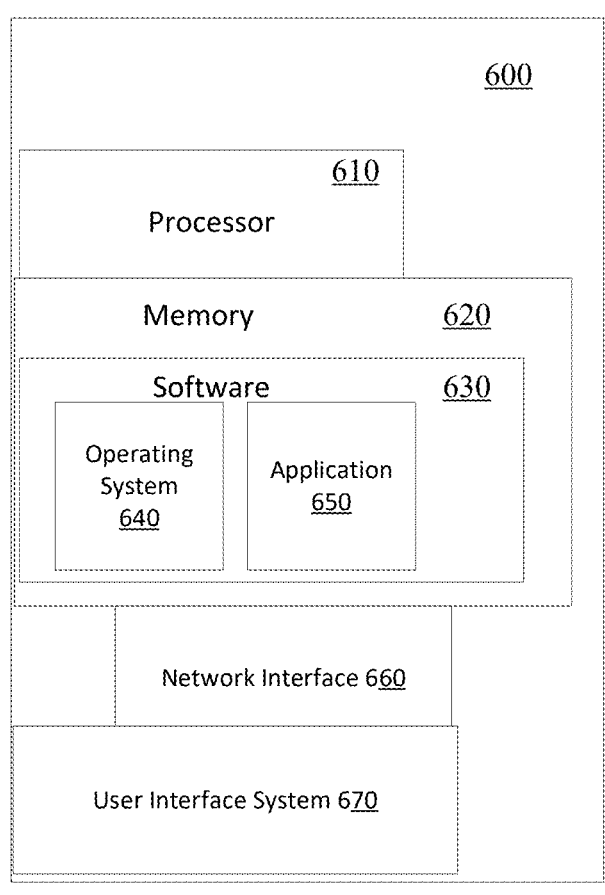
FIG. 6 illustrates a schematic diagram illustrating components of a computing device.

FIG. 6 illustrates a schematic diagram illustrating components of a computing device. The computing device can be representative of user device and buddy device as described herein. Referring to FIG. 6, a computing device 600 can include at least one processor 610, a memory 620, software 630 that includes operating system 640 and application 650, network interface 660, and user interface 670. Processor 610 processes data according to instructions of software 630. The instructions of application 650 may be loaded into computing device 600 and run on or in association with the operating system 640. Computing device 600 can further include a user interface 670, which may include input/output (I/O) devices and components that enable communication between a user and the computing device 600. Computing device 600 may also include a network interface 660 that allows the system to communicate with other computing devices, including server computing devices and other client devices, over a network.

Certain embodiments of the illustrated methods and circuitry include the following.

Clause 1. A method of performing local device attestation, the method comprising: receiving, by a trustable device, an instruction from a user to perform attestation of a user device; creating, by the trustable device, an attestation request comprising a random number whereby attestation evidence is generated and includes the random number, the attestation evidence is signed, and the attestation evidence is communicated to a verifier to generate an attestation result of the attestation evidence; receiving, by the trustable device, the attestation result of the verifier, the attestation result including a signature of the verifier; and validating, by the trustable device, content of the user device by: verifying the signature of the verifier in the attestation report.

Clause 2. The method of clause 1, wherein the attestation evidence is generated by measuring components of the user device and adding the measurements with signatures to the attestation evidence.

Clause 3. The method of clause 2, wherein measuring components of the user device includes at least one of measuring a bootloader, measuring an operating system, and measuring an application of the user device.

Clause 4. The method of any preceding clause, wherein the verifier utilizes a transparency log to determine that a measurement of a component in the attestation evidence matches a value of a same component in the transparency log, and wherein the determination is provided in the attestation result.

Clause 5. The method of any preceding clause, wherein the trustable device is a security dongle that includes cryptographic signing capabilities and a random number generator.

Clause 6. The method of clause 5, further comprising establishing a connection between the user device and the security dongle for attestation of the user device by inserting the security dongle into a data port on the user device.

Clause 7. The method of clause 5, further comprising storing the attestation request comprising the random number in memory on the user device.

Clause 8. The method of clause 5, further comprising establishing a connection between the user device and the security dongle for attestation of the user device by pairing the security dongle with the user device over a wireless network.

Clause 9. The method of any clauses 5-8, wherein the trustable device is an attested security dongle.

Clause 10. The method of any preceding clause, wherein receiving the attestation request, by the user device, includes initiating an attestation mode for the attestation of the user device in response to a boot of the user device.

Clause 11. The method of clause 5, further comprising communicating, by the security dongle, the attestation result in an attestation report using LED lights on the security dongle.

Clause 12. The method of clause 1, wherein the trustable device is a secure enclave disposed on the user device.

Clause 13. The method of clause 12, further comprising communicating, by the secure enclave, the attestation result in an attestation report to the user device for presentation at a user interface, wherein the attestation result is communicated using secure I/O.

Clause 14. The method of clause 1, further comprising specifying, by the trustable device, in the attestation request a particular verifier to perform a verification on the attestation evidence.

Clause 15. The method of clause 1, wherein verifying the signature of the verifier, by the trustable device, is performed by checking that the signature of the verifier of the attestation evidence matches a corresponding a verifier public key and that the random number is included in the attestation result.

Clause 16. The method of any preceding clause, wherein the verifier executes within a secure computing system environment.

Clause 17. A system for performing local device attestation, comprising: a user device for attestation; a trustable device in communication with the user device, the trustable device creates an attestation request of the user device whereby initiating generation of attestation evidence upon a boot of the user device, wherein the attestation evidence is communicated to a verifier; and the verifier that verifies the attestation evidence and communicates attestation results in an attestation report to the trustable device, wherein the trustable device validates the attestation report for the user device, and wherein the trustable device is one of a security dongle, a secure enclave disposed on the user device, and a buddy device.

Clause 18. The system of clause 17, wherein the attestation request comprises a random number.

Clause 19. The system of clause 17 or 18, wherein the trustable device is a security dongle that includes cryptographic signing capabilities and a random number generator.

Clause 20. The system of any clause 17-19, wherein the security dongle is an attested security dongle.

Although the subject matter has been described in language specific to structural features and/or acts, it is to be understood that the subject matter defined in the appended claims is not necessarily limited to the specific features or acts described above. Rather, the specific features and acts described above are disclosed as examples, implementing the claims and other equivalent features and acts; they are intended to be within the scope of the claims.

What is claimed is:

1. A method of performing local device attestation, the method comprising:

receiving, by a trustable device implemented as a dedicated secure subsystem or a separate local hardware component, an instruction from a user to perform attestation of a user device;

creating, by the trustable device, an attestation request comprising a random number whereby attestation evidence is generated and includes the random number, the attestation evidence is signed, and the attestation evidence is communicated to a verifier local to the user device to generate an attestation result of the attestation evidence;

receiving, by the trustable device, the attestation result of the verifier, the attestation result including a signature of the verifier; and validating, by the trustable device, content of the user device by:

verifying the signature of the verifier in the attestation report.

2. The method of claim 1, wherein the attestation evidence is generated by measuring components of the user device and adding the measurements with signatures to the attestation evidence, wherein the signed measurements are cryptographic hash values.

3. The method of claim 2, wherein measuring components of the user device includes at least one of measuring a bootloader, measuring an operating system, and measuring an application of the user device.

4. The method of claim 2, wherein the verifier utilizes a transparency log to determine that a measurement of a component in the attestation evidence matches a value of a same component in the transparency log, and wherein the determination is provided in the attestation result.

5. The method of claim 1, wherein the trustable device is a security dongle that includes cryptographic signing capabilities and a random number generator.

6. The method of claim 5, further comprising establishing a connection between the user device and the security dongle for attestation of the user device by inserting the security dongle into a data port on the user device.

7. The method of claim 5, further comprising storing the attestation request comprising the random number in memory on the user device.

8. The method of claim 5, further comprising establishing a connection between the user device and the security dongle for attestation of the user device by pairing the security dongle with the user device over a wireless network.

9. The method of claim 5, wherein the trustable device is an attested security dongle.

10. The method of claim 1, wherein receiving the attestation request, by the user device, includes initiating an attestation mode for the attestation of the user device in response to a boot of the user device.

11. The method of claim 5, further comprising communicating, by the security dongle, the attestation result in an attestation report using LED lights on the security dongle.

12. The method of claim 1, wherein the trustable device is a secure enclave disposed on the user device.

13. The method of claim 12, further comprising communicating, by the secure enclave, the attestation result in an attestation report to the user device for presentation at a user interface, wherein the attestation result is communicated using secure I/O.

14. The method of claim 1, further comprising specifying, by the trustable device, in the attestation request a particular verifier to perform a verification on the attestation evidence.

15. The method of claim 1, wherein verifying the signature of the verifier, by the trustable device, is performed by checking that the signature of the verifier of the attestation evidence matches a corresponding a verifier public key and that the random number is included in the attestation result.

16. The method of claim 1, wherein the verifier executes within a secure computing system environment.

17. A system for performing local device attestation, comprising:

a user device for attestation;

a trustable device in communication with the user device, the trustable device creates an attestation request of the user device whereby initiating generation of attestation evidence upon a boot of the user device, wherein the attestation evidence is communicated to a verifier; and the verifier that verifies the attestation evidence and communicates attestation results in an attestation report to the trustable device, wherein the trustable device validates the attestation report for the user device, and wherein the trustable device is one of a security dongle, a secure enclave disposed on the user device, and a buddy device.

18. The system of claim 17, wherein the trustable device is a security dongle that includes cryptographic signing capabilities and a random number generator.

19. The system of claim 18, wherein the security dongle is an attested security dongle.

20. A method of performing local device attestation, the method comprising:

receiving, by a trustable device, an instruction from a user to perform attestation of a user device;

creating, by the trustable device, an attestation request comprising a random number whereby attestation evidence is generated and includes the random number, the attestation evidence is signed, and the attestation evidence is communicated to a verifier to generate an attestation result of the attestation evidence;

receiving, by the trustable device, the attestation result of the verifier, the attestation result including a signature of the verifier; and validating, by the trustable device, content of the user device by:

verifying the signature of the verifier in the attestation report, wherein the attestation evidence is generated by measuring components of the user device and adding the measurements with signatures to the attestation evidence, wherein the signed measurements are cryptographic hash values.

* * * * *